United States Patent Office 2,936,443
Patented May 10, 1960

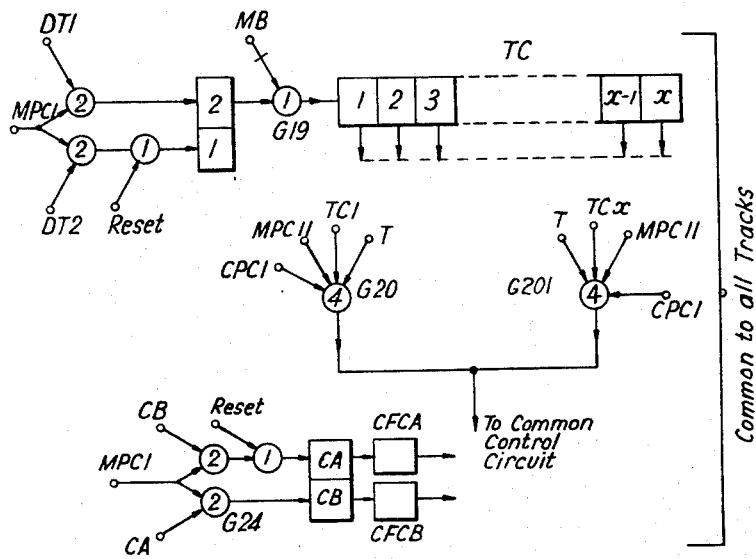
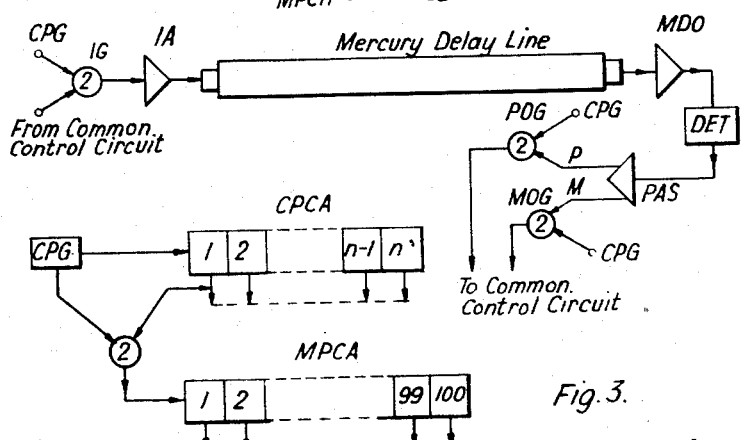
Fig. 2.
Fig. 3.
Inventor
D. A. WEIR
By Robert Hardig
Attorney Inventor
D. A. WEIR

2,936,443

TESTING ARRANGEMENTS

Donald Adams Weir, London, England, assignor to International Standard Electric Corporation, New York, N.Y., a corporation of Delaware Application March 18, 1954, Serial No. 417,189

Claims priority, application Great Britain March 25, 1953

11 Claims. (Cl. 340—174)

The present invention relates to equipment for storing intelligence in memories.

The term "memory" as used in this specification means a device in which intelligence can be recorded by creating internal strains in material and in which stored intelligence predetermined portions thereof can be detected by detecting the state of the strain in the material or in corresponding portions thereof.

Examples of internal strains which are used to store intelligence are magnetisations of either one of two polarities, as in the magnetic drum, tape or wire, or in the static magnetic matrix, electrifications of either one of two polarities as in the ferro-electric storage matrix, electric charges of either one of two polarities as in the cathode ray tube storage device, and compression waves in acoustic delay lines and magnetrostrictive delay lines.

The term "memory" as used in the present specification and in the claims appended thereto should therefore be interpreted to include any device falling within the terms of this definition, and in any case includes all the examples listed in the preceding paragraph.

Certain forms of intelligence storage equipment using such a memory use the memory in such a way as to provide a number of separate storage sections or stores which cooperate with recording and reading means. How this can be effected in the case of these different forms of memory will be more fully described hereafter. Associated with the recording and reading means there is a common control circuit, which co-operates with these stores.

It is an object of the present invention to provide equipment wherein the operation of such a common control circuit can be tested.

According to the present invention there is provided intelligence storage equipment in which the memory is sub-divided into a number of separate storage sections and a test section. Recording and reading means are associated with the memory and are arranged to read from and record in the sections. A control circuit is associated with the recording and reading means and is arranged to perform a sequence of operations to control the recording in the respective storage sections. When a test section comes into operative relation with said recording and reading means, a test sequence of operations is initiated by said control circuit, the operations of which are checked by a checking means which controls an indicator to give an indication if said test sequence is not correctly performed.

The invention will now be described with reference to the accompanying drawings, in which:

Fig. 2 shows monitor circuits associated with the system of Fig. 1.

Fig. 3 is a schematic diagram of an application of the invention wherein the memory is a mercury delay line.

Figure 1:
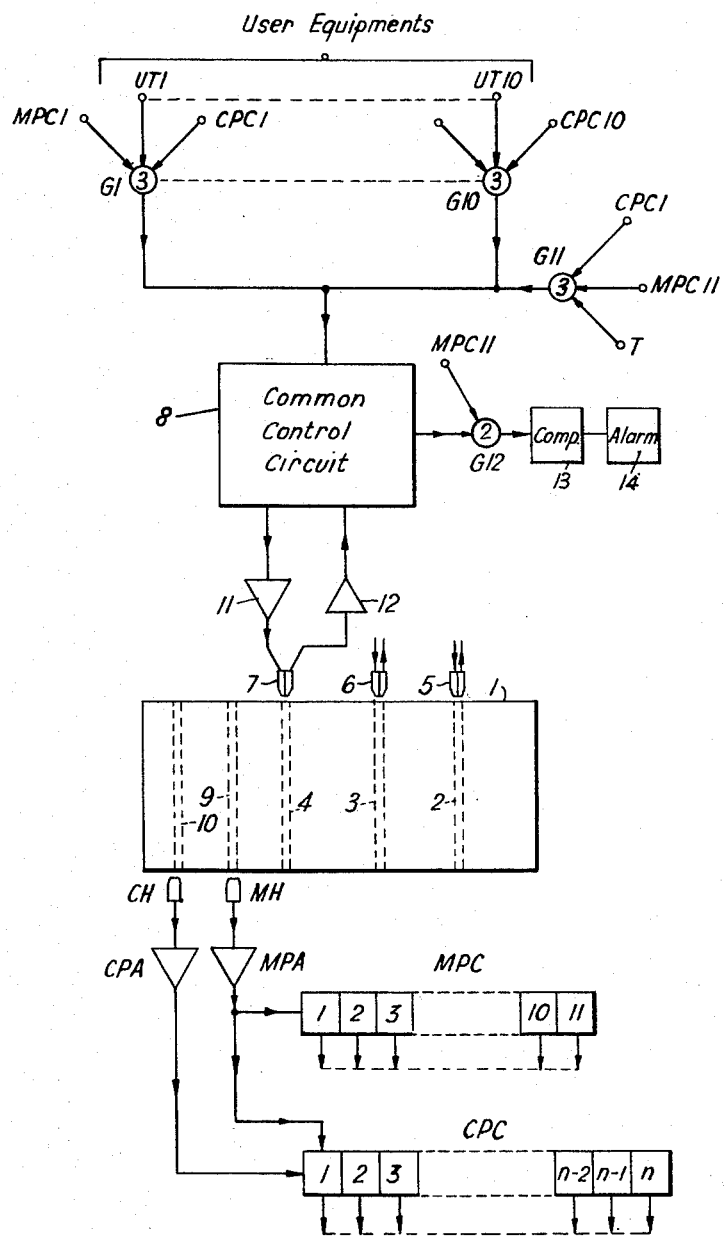
Fig. 1 is a schematic diagram of an application of the present invention wherein the memory is a circumferential magnetic track on the surface of a rotatable drum.

The drum used in the embodiment of Fig. 1 is a brass drum having a peripheral magnetic skin constituting a plurality of circumferential magnetic tracks, and is driven by an electric motor at a speed of 3000 r.p.m., the motor being one which will turn the drum at a substantially unvarying speed. The magnetic skin, which may be formed by nickel powder sprayed on to the drum, has associated with it a number of compound recording and reading heads. Each such compound head is asociated with one circumferential track, the reading portion of the head being ahead of the recording portion from the operational point of view. The recording head is arranged to record intelligence as a succession of unspaced longitudinal saturated magnetisations of either one of two polarities.

Each storage track on the drum is used to provide a number of independent storage sections which are usable independently. These storage sections appear successively at the compound head.

Referring now to Fig. 1, the drum 1 is shown as having three storage tracks 2, 3, 4 with which are associated compound recording and reading heads 5, 6 and 7 respectively. These tracks are in actual fact closely spaced on the surface of the drum, and there is no visible indication of the presence of these tracks. This means that the drum must be accurately mounted in its bearings, having negligible longitudinal "wobble."

Associated with each compound head there is a common control circuit. Only the common control circuit 8 associated with head 7 has been shown in Fig. 1. This circuit co-operates with all storage sections of one track in turn, and when a storage section completes its passage under the head, the common control circuit 8 is restored to its zero or rest condition. When the next storage section commences to appear at the head, the control circuit is able to co-operate therewith.

The majority of the operations performed by the common control circuit 8 occur under control of cycles of pulses derived from permanent recordings made on additional tracks on the surface of the drum. It will be remembered that each track is used as a number of independent stores, and it will be assumed that ten such stores are provided. Each track also includes an additional section whose purpose will be described hereinafter. Thus there are eleven sections per track. Since there is no visible indication on the track defining these sections, a control track 9 known as the marker track is provided. This has a "mark" (or one) recording aligned longitudinally with the first element position of each section of a track. This track is common to all storage tracks.

Associated with the marker track 9 there is a reading head MH known as the marker head. The output from this head is applied, via an amplifier MPA, to a counter MPC having the same number of units, eleven, as there are sections on each track. While the first section on a track is passing the associated compound head, MPC has its unit No. 1 operated and all other units unoperated; when the second section of a track is passing the compound head, MPC has unit 2 only operated, and so on.

In order to ensure that the counter MPC and the marker pulses from the track are in step, the marker track has a second recording in the second element position of one section, i.e. immediately following the marker recording for that section. This is detected by the circuitry and used to reset MPC to MPC1 on each cycle.

There is a second control track 10, known as the clock track, which has a mark recording aligned longitudinally with every element position of a track. The recordings thereon are read by a reading head CH, known as the clock head, and passed via an amplifier CPA to a counter CPC. This has a number of units equal to the number of element positions per section, or where all sections are not of equal size to the largest number of element positions in a section. This causes no inaccuracy or failure of control, since the clock pulse counter is "homed" or reset to its first position CPC1 by each marker pulse. Where all sections are of equal capacity this reset connection is merely a check that CPC is reset at CPC1 for the next section.

Any additional control pulses are derived from either or both of these pulse sources. Thus if an operation must occur in element position 3 of a section, that operation can only occur when CPC has its unit 3 operated, with its output CPC3 energised.

It has already been stated that common control circuit 8 co-operates with the sections on the track successively. In the system for which the present invention was developed, the sections are each permanently assigned to one of a number of user equipments and are used to count electrical pulses received from the user equipments. Each such pulse causes that one of terminals UT1 to UT10 individual to the "calling" user equipment to be energised. Such a system has been described in co-pending applications Serial No. 287,383, Serial No. 289,384, Serial No. 289,385, Serial No. 289,386, all filed May 22, 1952, and so will not be described here. Clearly the invention is not limited in its application to systems of this type.

Between terminals UT1 to UT10 and the common control circuit there is a set of ten gates G1 to G10 respectively. These gates are shown as circles having a number of control inputs and a single output, the arrows pointing to the circle representing inputs and the arrow pointing away from the circle representing an output. Each circle encompasses a number which represents the number of inputs which must coincide to derive an output. Each control input is labelled with the source of that control, and when all of a gates' controls are simultaneously energised, that gate delivers an output.

Thus it will be seen that each gate delivers an output when the first element position of a section is under the head 7 if there is a pulse to be counted on the input lead for the corresponding user equipment. Hence these gates may be said to constitute an electronic equivalent of a finder switch. When a gate delivers an output, the common control circuit causes the stored total in the corresponding section to be read out by head 7, to be modified by the addition of one, and to be re-recorded by the head 7. This occurs as set out in the above-quoted applications, care being taken as set out therein that a pulse is only added once even if it persists for several rotations of the drum.

It is necessary now to consider the main feature of the present invention, which is the arrangements for testing the operation of circuit 8. This is the purpose of the additional section per track mentioned above.

The input gates to circuit 8 include an extra gate G11 which is prepared once in each revolution of the drum 1 from two controls from MPC11 and CPC1, that is at the first element position of the eleventh section. The third input to this gate G11 is a test input T. This input is permanently energised, for example from a battery (not shown), so that on each revolution of the drum one is added in to the section reserved for test purposes. If, as in the system mentioned above, the arrangements are provided which ensure that a pulse which persists for more than one revolution is only added once, these must be disabled for this test operation. This, however, occurs under control of MPC11, means being provided to cancel this function when MPC11 is energised. Clearly the test cycle could also be adapted to test this disabling function if necessary.

It will be seen, therefore, that each time the eleventh or test section appears at the head 7, one is added to the contents thereof. Since the recording is made in binary digital code in the system to which the invention is applied, when the addition occurs correctly the first element position of the section alternates from 1 to 0 on successive appearances. Hence the test section can consist of only one element position.

The output read by the head 7 is therefore fed from the common control circuit 8 via a gate G12 which only opens at MPC11 to a comparator 13. This gives an output to operate an alarm 14 if the comparator detects a faulty operation.

When there are several storage tracks on the drum with a single common control circuit which can be assigned via gates to any track, the comparator is assigned to the tracks in turn for two drum revolutions at a time. The arrangements whereby this is achieved are shown in Fig. 2.

Since the testing involves assigning the test means to each track for two drum revolutions, an additional track selection counter TC is provided. This is controlled via a gate G19 which will be described later, from a divide-by-two binary pair DT driven from MPC1 of the marker pulse counter. It will be seen that counter TC is stepped once for each two revolutions of the drum. The single test gate G11 of Fig. 1 is replaced by a set of gates, such as G20, G201, equal in number to the number of the storage tracks. Each of these gates has four controls, T, the TC output, CPC1 and MPC11. It has been assumed here that the test store is always section No. 11 on its track, but this need not be so. If any other-numbered section is used, the control of the appropriate test gate is altered accordingly. The commoned outputs of the test gates go to the common control circuit.

Also common to all tracks is a divide-by-two multivibrator flip-flop pair CA—CB, which drives two cathode followers CFCA and CFCB respectively to produce the CA and CB output pulses.

Each track is provided with a monitor multivibrator flip-flop pair MA—MB, of which MA is normally energised. This maintains relay AL, shown schematically in Fig. 2, normally operated with its contacts al1 and al2 opened. To set the device, the reset key is closed, which applies a momentary positive potential to all MA tubes, which therefore operate, and also to the other reset connections shown in Fig. 2.

The second unit MB of MA—MB is controlled via two four-input gates G21 and G22 via a one input gate G23. The two gates G21 and G22 compare the outputs from CA—CB with what is read off the first element of the test store. Hence the control for G21 is 0, energised if 0 is read off the track, MPC11 and CPC1 defining the first element of the test store, and CA. When the first MPC1 pulse occurs, CB is operated via its gate G24, and CA is extinguished. The fact that CA—CB and DT1—DT2 change over at MPC1 makes it important that the section corresponding to MPC1 be not the test section.

Considering gate G22, it will be seen that on the first revolution for the track to which MA—MB applies, it will have controls CB, CPC1 and MPC11 energised at the start of the test store. At this time 0 is read from the track, so the control input marked 1 applied to gate G22 supplies no pulse and gate 22 does not open. Hence MB is unaffected.

On the second revolution of the drum for this track, G21 is involved. At the beginning of this revolution CA is re-operated, so when the start of the test section is again reached G21 has its inputs CPC1, MPC11 and CA energised. The 1 added on the previous revolution means that 1 is read from the track, so that the fourth input of G21 is not energised, and so G21 does not open. Hence MB is again unaffected.

The previous paragraph has described the state of gates G21 and G22 during correct functioning of the common control circuit. If the common control circuit fails to operate satisfactorily, 1 will be read where 0 should be read, or 0 will be read where 1 should be read. This will cause G21 or G22 to open, and via G23, to operate MB. When MB operates, its output energises a second input to G19, which has a short line transverse to it. This indicates that this input is an inhibiting input: thus when MB is operated G19 cannot pass pulses, so TC is stopped with its output energized corresponding to the track on which a fault is found. MB operating renders MA inoperative, releasing AL and operating the alarm. As shown there is a lamp per track and a common buzzer.

When the fault is cleared the attendant operates the reset key to re-start normal operations.

If the fault lies in the track, and not the common control circuit, then a new track is used to replace the faulty one, if spare tracks exist.

This arrangement is also applicable where each track has its own common control circuit, and clearly the routine performed in the test section depends on the use of the equipment. Similarly the number of element positions of the test section and the form of the comparator obviously depend on the nature of the test routine.

In certain systems using magnetic tracks on a rotatable drum the recording head, and the reading head are separated, normally being diametrically opposed. In such systems it will be seen that a storage section comprises two separated lengths of the track.

The second embodiment of the invention, shown in Fig. 3, uses a mercury delay line as the memory. In this case the pulse supplies previously obtained from tracks on the drum now have to be provided by external circuit means, shown as a clock pulse generator CPG. The output pulses from this are applied to the clock pulse counter CPCA, which is similar to CPC in Fig. 1. Also controlled from CPG is a second counter MPCA, which gives an output defining each of a number (100 in the case shown), of independent storage sections into which the storage space is divided. The outputs from CPG, CPCA and MPCA control all operations.

Mercury delay line storage has become well-known in connection with electronic computers, and an example of a storage system for a computer is described in the British journal "Electronic Engineering" for July 1948, in an article by Wilkes and Renwick entitled, "An Ultrasonic Memory Unit for the Edsac," on pages 208 to 213.

It will be assumed that a series of stored numbers are circulating in the delay line. These numbers are read out at the right hand end, amplified by an amplifier MDOA, the output of which is applied to a detector DET. This latter is necessary since the intelligence is stored in the delay line as pulses of radio frequency of the order of 13.5 mc./s.

The detected pulses are applied to a pulse amplifier and shaper PAS, which is arranged to give two outputs, one of which, P, will be a positive pulse, and the other, M, will be at earth, when an element is at mark, i.e. when the line delivers an output pulse. When there is no element, P is at earth and M is positive. The outputs from PAS are gated by clock pulses from CPG via gates POG and MOG respectively to the common control circuit.

Pulses from the common control circuit for recording are applied via the input CPG to gate IG, which thus applies them under control of clock pulses to the input amplifier IA. The pulses which are gated through IG to the amplifier IA are short pulses of R.F. of the order of 13.5 mc./s.

Figure 4:
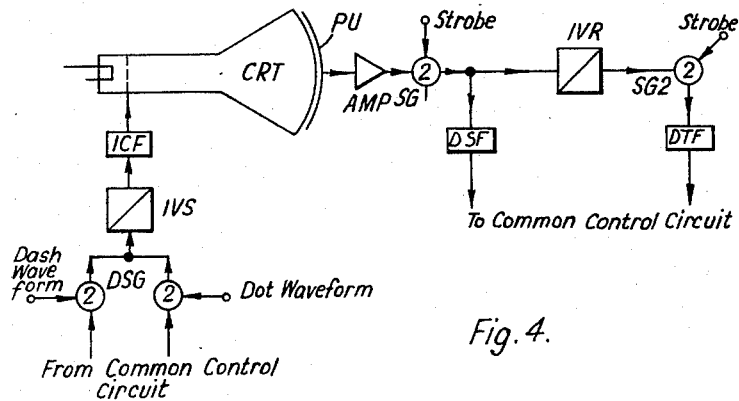
Fig. 4 is a schematic diagram of an application of the invention wherein the memory is a cathode ray tube.

The third embodiment of the invention, shown in Fig. 4, is an example of a system in which the memory is an electrostatic storage tube. This system uses a cathode ray tube CRT, and the memory is based on the dot-dash display system described in "A Storage System for Use With Binary Digital Computing Machines" by Williams and Kilburn, published in the Journal of the I.E.E., part III, March 1949.

A signal or pick up plate PU consisting of a sheet of metal foil or gauze, external to the end of the cathode ray tube CRT, is closely attached to the face of the tube. Thus each individual element storage position of the screeen of CRT is capacitively coupled to a common channel, as in the iconoscope. The stored digits are represented by charge distributions which exist in small areas in two-dimensional array on the screen. The areas are subjected sequentially, line-by-line, to electron bombardment from the electron gun (not shown) associated with tube CRT, and the output signals representative of the stored information are obtained from the pick up plate PU. Strobe and dot and dash waveforms are obtained as described in the above mentioned article. The other pulses required are derived in well-known manner from the strobe pulses. The X time-base circuit for the cathode ray tube is similar to that described for the dot-dash system, but the Y time-base circuit is similar to a television type time-base in which the beam is caused to move progressively down the face of the tube.

It is assumed that a series of numbers has been recorded on the cathode ray tube and that the first element, a dash is just being scanned by the beam. The positive output is amplified by the amplifier AMP and passes to a gate SG1, where it is gated by a strobe pulse to give a positive output from the gate. Had the element been a dot the output from the amplifier would have been negative, in which case there would be no output from the gate.

The output from the gate SG1 passes to an inverter IVR, and in parallel therewith to a cathode follower DSF, the dash cathode follower. The inverter output passes to another strobe pulse controlled gate SG2, the output from which is applied to a cathode follower DTF, the dot cathode follower. Thus when a dash element is scanned by the beam, DSF gives a positive output and DTF gives no output, and vice-versa when a dot element is scanned by the beam. The outputs from these cathode followers go to the common control circuit.

The outputs from the common control circuit are taken to gates DSG and DTG, the former being controlled by the dash waveform and the latter by the dot waveform. When a dash is to be recorded there will be a dash waveform from DSG and when a dot is to be recorded there will be a dot waveform from DTG. The outputs from these gates are negative going, and are inverted by an inverter IVS and applied to the grid of the cathode ray tube via the cathode follower ICF.

Different parts of the screen are used as separate storage sections, and one of these is used for the test of the common control circuit as described above.

Figure 5:
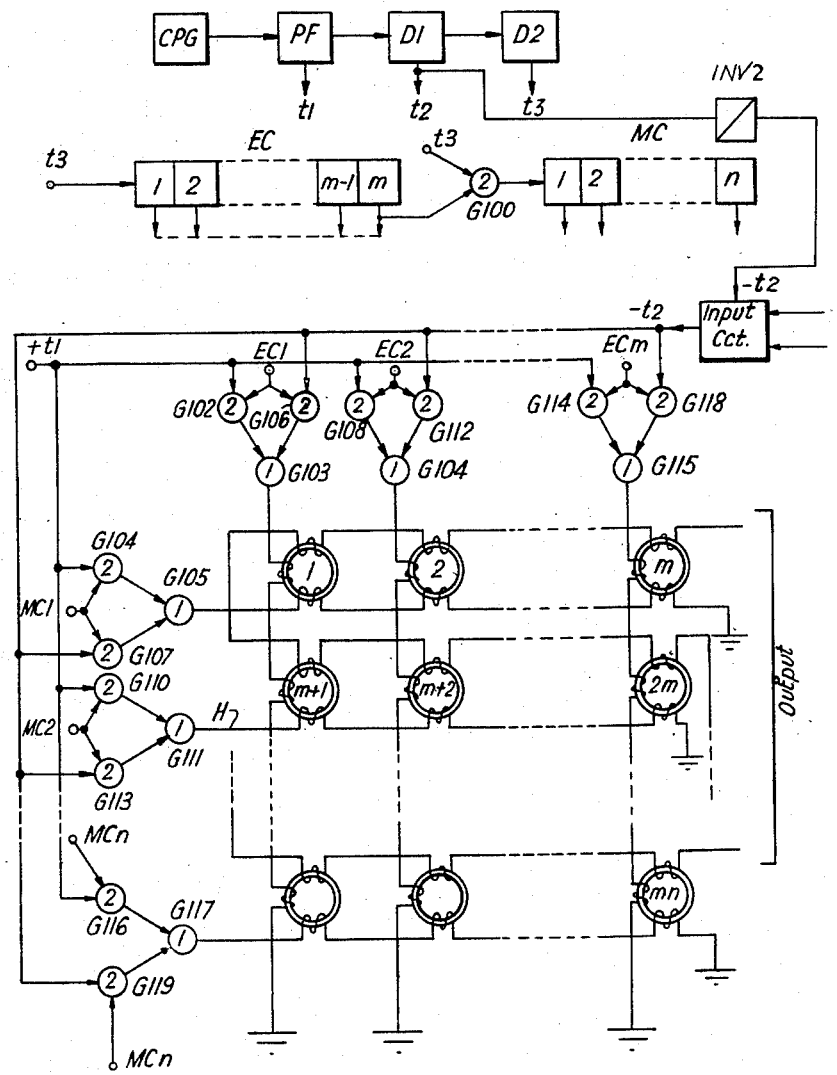
Fig. 5 is a schematic diagram of an application of the invention wherein the memory is a ferro-magnetic matrix.

The next embodiment to be described is that using the ferro-magnetic matrix, shown in Fig. 5. A memory of this type is described and illustrated in a paper entitled "Static Magnetic Memory Matrix and Switching Circuits," by J. A. Rajchman in the R.C.A. Review for June 1952 at pages 183 to 201.

Such a matrix comprises a number of cores of magnetic material each of which can be set to either one of two stable states, which for convenience may be called positively and negatively magnetised respectively. One core per element of intelligence to be stored is provided. These are arranged to form in number of rows $m$ and columns $n$ of cores.

Each core has three windings, two being control windings and one a read-out winding. It will be seen that the uppermost windings on all cores are interconnected by a lead which forms a common output connection:

these windings are the read-out windings. The control windings are coordinately interconnected as shown.

As more fully described in the Rajchman paper, to select a given core, e.g. core $m+2$, the appropriate vertical lead V and the appropriate horizontal lead H are selected. Each then carries a current half that necessary to charge the state of the core, the direction being such as to magnetise the core positively. Only $m+2$ can be charged, and it obviously can only be charged if it is already negatively magnetised. The change-over so produced causes a large change in the flux through the read-out coil of that core, and hence an output pulse. Recording will be described later. The windings on the cores are actually single wires threading the appropriate cores.

As in the case of the delay line and cathode ray tube memories it is necessary to provide pulse sources. These are derived from a clock pulse generator CPG, which, via a pulse shaper PF and two delay circuits D1 and D2 produces a set of three staggered control pulses $t1$, $t2$, $t3$ per clock pulse. The input circuit to the memory is also able to emit $-t2$ pulses as and when required. The $-t2$ pulses are produced by inverter INV2, under control of $t2$ pulses from D1, and applied to the input circuit, which passes a $-t2$ pulse when a particular condition (e.g. mark) is to be recorded.

Counter EC, the "row" counter, has a number of units $m$ equal to the number of elements per row, and is stepped once in response to each $t3$ pulse. Counter MC has a number of units $n$ equal to the number of cores per column, and is stepped once via gate G100 by the coincidence of EC having its unit EC$m$ operated and the occurrence of a $t3$ pulse.

The outputs from EC are applied to the gates which control the currents flowing in the vertical "column" windings, and the outputs from MC are applied to the gates which control the currents flowing in the horizontal "row" windings. Considering one ferro-magnetic element, which is a ring shaped core through which the windings formed by single wires pass, the amplitude of the two currents acting together in an additive direction is sufficient to produce, as has been fully described by Rajchman, a magnetomotive force adequate to drive a core beyond the "knee" of the hysteresis loop. However, one of the currents alone cannot produce a magnetomotive force adequate to drive a core beyond the knee.

As has also been described by Rajchman, the reading-out operation is to drive the chosen core to be magnetised positively irrespective of its previous state. Thus if the previous state was for the core to be positively magnetised, there is no output. If the previous state was negative magnetisation an output pulse is produced from the cores reading winding. It should be noted that the reading windings are such that alternate cores produce opposite polarity pulses, which serves to overcome cumulative demagnetising forces, as has been pointed out by Rajchman.

It will be assumed that the counters EC and MC have their units $m$ and $n$ respectively energised. The $t3$ pulse of that element position steps EC to EC·1, and at the same time G100 opens to the coincidence of $t3$ and EC$m$, so MC steps to MC·1. At time $t1$, gates G102, G103, G104' and G105 are opened, so the first "column" of windings and the first "row" of windings each pass a current pulse. As has been seen, only core 1, which is the only one which is "doubly primed" can be affected. The direction of these pulses is such as to positively magnetise the core, so core 1 is unaffected if positively magnetised, and is charged over if negatively magnetised. In the latter case a read-out pulse occurs on the common output connection.

The output pulses are applied over a connection (not shown) both to the common control circuit and to the input circuit of Fig. 5. The input circuit is so arranged that if it is required to leave the core being "interrogated" positively magnetised there will be no output therefrom. However, if it is required to leave the core negatively magnetised, i.e. to retain the intelligence read out negatively magnetised a negative pulse $-t2$ is produced. This pulse is applied to and opens gates G107, G105, G106 and G103, and pulses in the reverse direction to the read-out pulses pass in the same control windings. As before, only core 1 is affected, and because of the pulse direction, this core is driven to the negatively magnetised state.

The next $t3$ pulse steps EC to EC2, so for the next $t1$ pulse, the gates for the second column and the first row open. Hence core 2 is now set to or left positively magnetised and an output pulse produced or not according to its previous state. The operation continues as described for each core in turn in the order indicated in Fig. 5, EC selecting the column and MC selecting the row.

In Fig. 5 it will be noted that the symbols for voltage gates are used shown in the interest of simplifying the diagram. However, as has been described, the matrix is current-controlled, the necessary currents being produced, for example, by hard valves controlled by the gates shown.

Figure 6:
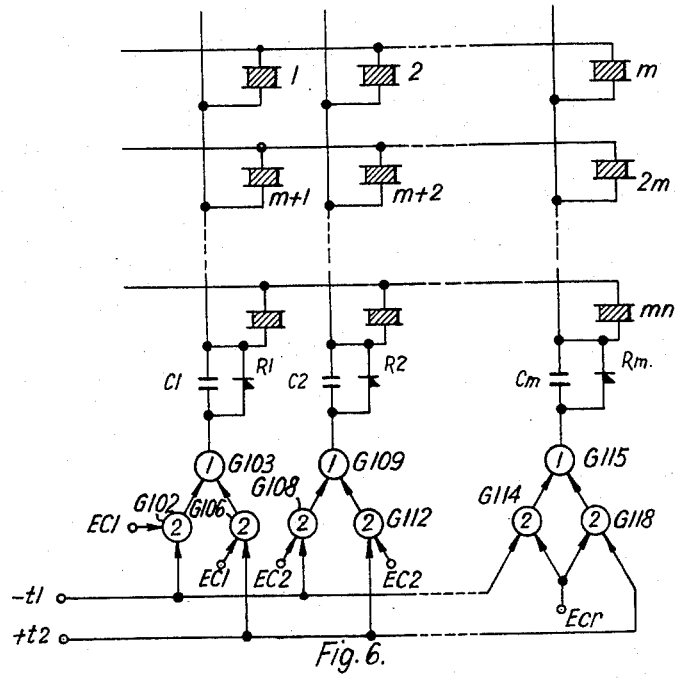
Fig. 6 is a schematic diagram of an application of the invention wherein the memory is a ferro-electric matrix.

Fig. 6 shows schematically a co-ordinate matrix which is generally similar to that shown in Fig. 5 except that it employs ferro-electric elements. Ferro-electric materials, also known simply as ferro-electrics, are dielectrics in which electric dipoles occur spontaneously and align themselves by mutual interaction. Their curves of dielectric induction against electric field show hysteresis loops similar to those shown by the B—H curves of ferromagnetic materials. Barium titanate ($BaTiO_3$) would appear at present to be the most practicable ferro-electric material available. A full description of the use of ferroelectrics as memories will be found in a paper entitled, "Ferro-electric Storage Elements for Digital Computers and Switching Systems" by J. R. Anderson, published in "Electrical Engineering" for October 1952 at pages 916 to 922.

The operation is in many ways similar to that of the ferro-magnetic matrix, as will become apparent. In view of the Anderson paper mentioned above it is only necessary to say that applying a "write" voltage pulse to an element sets it to one stable state of electrification, and a "read" pulse drives an element in which a pulse has been stored to its other stable state, giving a large output pulse. If the element being "interrogated" is already in its other stable state a very small or no output pulse occurs. Using barium titanate, an output pulse of 25 volts for a stored condition or mark has been obtained when the input pulse was 30 volts, 5 ms., as compared with 0.6 volt for no stored condition or space. In the present case shorter pulses are used, which reduces this discrimination slightly.

In the matrix of Fig. 6 the elements are connected in columns and rows as are the ferro-magnetic elements in Fig. 5. The gates in Fig. 6 are given the same references as are the corresponding gates in Fig. 5, and the counters and pulse supplies used are identical to those of Fig. 5 and so are not shown. To select a given element for reading or writing half the required voltage is applied to the "row" connection and half to the "column" connection, the halves being of opposite polarity. As before, read-out is at $t1$ and write or record is at $t2$.

The individual elements each have a capacitor C1 . . . C$m$ paralleled by a rectifier in series therewith in the basic device: in Fig. 6 these components are common to the columns. Output leads are taken from the columns to an output gate G144, and the arrangements similar to those in Fig. 5 for retaining read-out information are provided. Read out is by $+t1$ and $-t1$ pulses: write or record is by $+t2$ and $-t2$ pulses applied as shown.

One preferred form of matrix comprises a single large crystal of barium titanate of 4 to 10 mils. thickness and having a set of parallel conducting strips on each face: the two sets of strips being orthogonally related. Each cross-point provides a single storage element.

While the principles of the invention have been described above in connection with specific embodiments, and particular modifications thereof, it is to be clearly understood that this description is made only by way of example and not as a limitation on the scope of the invention.

What we claim is:

1. Intelligence storage equipment which comprises a memory which is sub-divided into a number of separate storage sections and a test section, recording and reading means associated with said memory and arranged to co-operate repeatedly with said sections, a control circuit associated with said recording and reading means and arranged to perform a sequence of operations in co-operation with the respective storage sections, means responsive to each initiation of operative relation between said test section and said recording and reading means to initiate a different test sequence of operations by said control circuit, means for checking the operations of said test sequence, and means under control of said checking means for giving an indication if said test sequence is not correctly performed.

2. Intelligence storage equipment, as claimed in claim 1, in which each said storage section is used to count received pulses in binary digital code, whereby on successive received pulses the condition stored in the first element position of a storage section alternates between binary 0 and binary 1, in which said test section comprises one element position, in which the means to initiate a test sequence comprises means operative on each occasion that said test section is in operative relation with said recording and reading means for adding 1 to the digit recorded in said test section, whereby the condition stored in said single element position forming the test section alternates between 0 and 1, and in which said checking means comprises means under control of said reading means for checking that the correct alternation occurs.

3. Intelligence storage equipment, as claimed in claim 1, and which comprises a plurality of said memories, a single control circuit common to all of said memories, a test section per memory, and a distributor also common to all of said memories arranged to assign the means for initiating a test sequence, the checking means, and the means for indicating a fault in said test sequence to said memories periodically and successively for long enough for a full test sequence to be performed.

4. Intelligence storage equipment, as claimed in claim 1, and in which the memory is an endless magnetic track on which intelligence may be recorded.

5. Equipment, as claimed in claim 4, and in which the endless magnetic track is disposed circumferentially on a rotatable member.

6. Intelligence storage equipment, as claimed in claim 1, and in which the memory is an acoustic delay line wherein intelligence is stored as compression waves.

7. Equipment, as claimed in claim 6, and in which the acoustic delay line is a mercury delay line.

8. Intelligence storage equipment, as claimed in claim 1, and in which the memory is a cathode ray tube wherein intelligence is recorded as discrete charge areas on a screen.

9. Intelligence storage equipment, as claimed in claim 1, in which the memory comprises a number of storage elements in which intelligence can be recorded as either one of two stable states, in which said recording means comprises means associated with said storage elements for recording intelligence by applying electrical energy to selected elements to set each said element to the appropriate one of said stable states, and in which said reading means comprises means for applying electrical energy to said elements in such a way as to set each said element to a predetermined one of said states, means for detecting a charge produced by said electrical energy applying means, and means for re-setting an element charged by said reading means if the intelligence read is to be retained, whereby said elements are scanned by said recording and reading means.

10. Equipment, as claimed in claim 9, wherein each said storage element is a ferro-magnetic element.

11. Equipment, as claimed in claim 9, wherein each said storage element is a ferro-electric element.

References Cited in the file of this patent

UNITED STATES PATENTS

| | | |
|---|---|---|
| 1,689,294 | Potts | Oct. 30, 1928 |
| 2,609,143 | Stibitz | Sept. 2, 1952 |
| 2,611,026 | Blanton | Sept. 16, 1952 |
| 2,828,358 | Ridler | Mar. 25, 1958 |